(12) United States Patent
Kim et al.

(10) Patent No.: US 11,687,237 B2
(45) Date of Patent: Jun. 27, 2023

(54) MEMORY DEVICE STATUS PUSH WITHIN MEMORY SUB-SYSTEM

(71) Applicant: Micron Technology, Inc., Boise, ID (US)

(72) Inventors: Chulbum Kim, San Jose, CA (US); Sundararajan Sankaranarayanan, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/393,727

(22) Filed: Aug. 4, 2021

(65) Prior Publication Data
US 2023/0045463 A1    Feb. 9, 2023

(51) Int. Cl.
*G06F 3/06* (2006.01)

(52) U.S. Cl.
CPC .......... *G06F 3/0604* (2013.01); *G06F 3/0619* (2013.01); *G06F 3/0659* (2013.01); *G06F 3/0679* (2013.01)

(58) Field of Classification Search
CPC .... G06F 3/0604; G06F 3/0619; G06F 3/0659; G06F 3/0679
See application file for complete search history.

(56) References Cited

U.S. PATENT DOCUMENTS

| | | | |
|---|---|---|---|
| 2012/0210157 A1* | 8/2012 | Wang | G06F 1/3206 713/500 |
| 2017/0060429 A1* | 3/2017 | Gupta | G11C 11/4096 |
| 2020/0226045 A1* | 7/2020 | Le | G06F 1/30 |

* cited by examiner

*Primary Examiner* — Edward J Dudek, Jr.
(74) *Attorney, Agent, or Firm* — Lowenstein Sandler LLP (57) ABSTRACT

A local media controller of a first memory device receives a first number of cycles broadcasted by a second memory device via a bus connecting the first memory device and the second memory device. The local media controller initializes a counter associated with the first memory device. Responsive to determining that the value of the counter matches the first number of cycles, the local media controller transmits a status of the first memory device via the bus. Furthermore, responsive to determining that the status is ready, the local media controller sends, to a memory sub-system controller managing the first memory device, a status of a memory region of the first memory device.

20 Claims, 6 Drawing Sheets

Receive, by a local media controller of a first memory device, a first number of cycles broadcasted by a second memory device via a bus connecting the first memory device and the second memory device. 410

Initialize a counter associated with the first memory device. 420

Responsive to determining that a value of the counter matches the first number of cycles, transmit a status of the first memory device via the bus, wherein the status comprise a second number of cycles associated with the first memory device, wherein the second number of cycles is determined in view of the status of the first memory device. 430

Responsive to determining that the status of the first memory device is ready, send, to a memory sub-system controller managing the first memory device, a status of a memory region of the first memory device. 440

MEMORY DEVICE STATUS PUSH WITHIN MEMORY SUB-SYSTEM

TECHNICAL FIELD

Embodiments of the disclosure relate generally to memory sub-systems, and more specifically, relate to a memory device status push within memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to memory device status push within a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Memory access operations can be performed by the memory sub-system. The memory access operations can be host initiated or memory sub-system controller initiated. For example, the host system can initiate a memory access operation (e.g., write operation, read operation, erase operation, etc.) on a memory sub-system. The host system can send memory access commands (e.g., write command, read command) to the memory sub-system, such as to store data on a memory device in the memory sub-system, or to read data from the memory device in the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

A non-volatile memory device can include a number of individual dies. The memory sub-system controller can include a number of input/output (I/O) ports and channels by which the memory sub-system controller can communicate with the individual dies. For example, there can be eight communication channels between the memory sub-system controller and the non-volatile memory device, where each channel can be enabled with a separate chip enable (CE) signal. Each communication channel can support a certain number of memory dies. For example, there can be 16 memory dies accessible via each channel. Each individual memory die can be configured as an individual logic unit (LU), identified by a unique logical unit number (LUN). Thus, a system with eight communication channels, and 16 LUs per channel, can include 128 separate LUs.

In course of performing certain operations, the memory sub-system controller often checks the status of various LUs in the memory sub-system. For example, after submitting a read command to a memory device, the memory sub-system controller can repeatedly poll the memory device to check whether the requested I/O data is ready for readout. In some systems, the memory controller sends a status polling command to one individual LU. In response, the LU returns the status of one or more parameters of the LU and/or memory die. For example, one of the bits of the status indicates whether the I/O data is ready for readout, and the remaining bits are associated with other statuses. Such status polling operations can be periodically performed on a given LU. In a memory sub-system with a large number of LUs (e.g., 128

LUs) and under a heavy workload, the number and frequency of these status polling operations being performed on individual LUs introduces significant system overhead and occupies considerable bandwidth in the communication channels between the memory sub-system controller and the memory devices in the memory sub-system.

Aspects of the present disclosure address the above-noted and other deficiencies by adding a status push sideband channel between the memory sub-system controller and the memory devices, thus decoupling the status polling commands from the I/O channel. A sideband channel is separate from the main communication channels between the memory sub-system controller and the memory devices. In embodiments, a single-bit serial bus is added between the memory sub-system controller and the memory device(s). The bus implements a sideband channel for which the memory device(s) take turns being the master, and for which the memory sub-system controller is the slave. Arbitration of the new bus can be enabled using a token ring architecture. When a memory device controller has possession of the token, the memory device controller can transmit the memory device's status to the memory sub-system controller. Upon receiving the memory device's status, the memory sub-system controller can act accordingly. That is, if the memory device is busy, the memory sub-system controller can wait to perform an I/O operation. However if the memory device is ready, the memory sub-system controller can perform the I/O operation using the existing I/O channel(s). Thus, the memory sub-system controller can avoid using the I/O channel(s) for status polling commands.

In some embodiments, a separate channel is added between the memory sub-system controller and the memory device(s) in order to communicate a clock synchronization. The clock synchronization can be transmitted during a power-up event, for example, or at a set interval (e.g., once every day). The clock can be used to implement the token ring architecture bus arbitration, which can provide each memory device within the memory sub-system with equal opportunity to transmit status information to the memory sub-system controller.

Advantages of the present disclosure include, but are not limited to, removing the burden of polling the memory devices from the memory sub-system controller, thus reducing power utilization associated with sending status polling commands. By freeing up the I/O channels from being used for status polling commands, the I/O channels can be used for I/O operations for which memory devices have communicated a ready status, resulting in an increase in the rate at which operations are performed by the memory sub-system controller (e.g., input/output operations per second (IOPs)). This can lead to improved performance of the memory sub-system, and a reduction in latency associated with I/O operations within the memory sub-system.

Figure 1A:
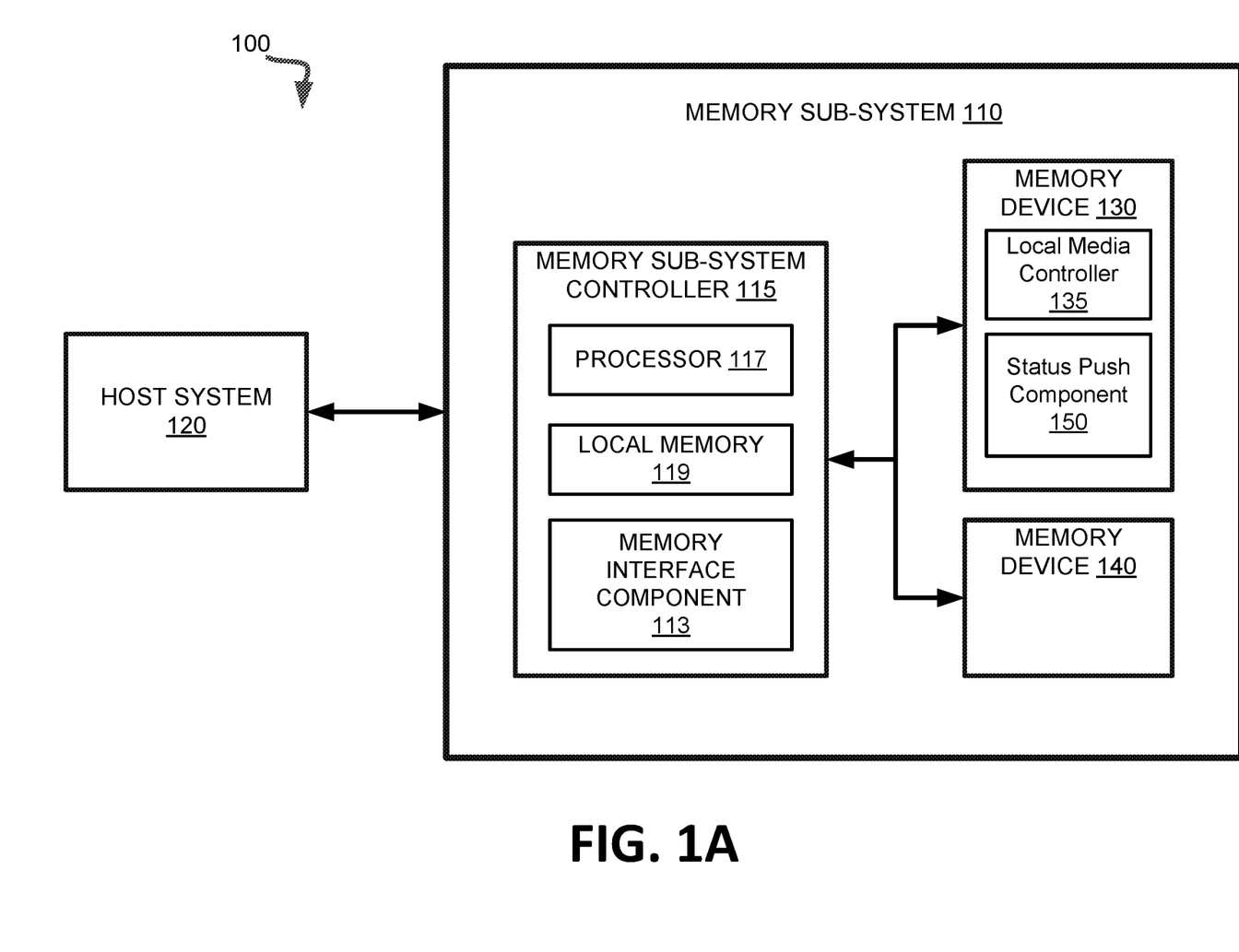
FIG. 1A illustrates an example computing system that includes a memory sub-system in accordance with some embodiments of the present disclosure.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a memory interface component 113 that can receive status information from memory devices via a sideband channel. In some embodiments, the memory sub-system controller 115 includes at least a portion of the memory interface component 113. In some embodiments, the memory interface component 113 is part of the host system 110, an application, or an operating system. In other embodiments, local media controller 135 includes at least a portion of memory interface component 113 and is configured to perform the functionality described herein.

In some embodiments, the memory device 130 includes status push component 150 that can transmit the status of the memory device to the memory sub-system controller via the sideband channel. In one embodiment, local media controller 135 of memory device 130 includes at least a portion of status push component 150. In such an embodiment, status push component 150 can be implemented using hardware or as firmware, stored on memory device 130, executed by the control logic (e.g., local media controller 135) to perform the operations related to power budget arbitration for multiple concurrent access operations described herein. In some embodiments, the memory sub-system controller 115 includes at least a portion of status push component 150. For example, the memory sub-system controller 115 can include a processor 117 (e.g., a processing device) configured to execute instructions stored in local memory 119 for performing the operations described herein.

In some embodiments, memory sub-system 110 employs a token-based protocol, in which a token rotates (e.g., in a round robin fashion) among multiple push status components 150 (e.g., after a number of cycles of a shared clock signal). When push status component 150 holds the token, it can transmit the status of the associated memory device 130, along with the status of one or more regions within memory device 130. Push status component 150 can transmit the status to the other push status components of other memory devices in memory sub-system 110. The transmitted status can indicate to the other push status components in memory sub-system 110 the number of bits that the memory device intends to transfer to memory sub-system controller 115, thus indicating the amount of time (e.g., the number of cycles of the shared clock) the status push component intends to hold the token.

In some embodiments, memory interface component 113 can transmit a synchronized clock command to each status push component. Thus, each status push component 150 can keep track of the cycle count, and each status push component 150 can anticipate when it will receive the token based on the number of bits transmitted by the previous status push component in the round robin ring architecture arbitration. The timing of the status push cycles is described further with regard to FIGS. 2 and 3.

Memory interface component 113 can receive status information from status push component 150. In some embodiments, the status information can indicate whether the associated memory device is busy or ready, whether regions within the associated memory device are busy or ready, and/or whether certain operations executed within the regions have passed/failed. If the received status information indicates that memory device 130 is ready, memory interface component 113 can perform input/output operations with memory device 130. However, if the received status information indicates that memory device 130 is busy, memory interface component 113 can decide not perform I/O operations with memory device 130, thus leaving the I/O channels open for I/O operations to be performed with respect to other memory devices within memory sub-system 110.

In some embodiments, the status information received from status push component 150 can include additional information, such as cell distribution information, soft decision information, outliers of performance metrics, thermal alerts, memory device initiated interrupts, and so on. The status push component 150 can determine which status information to include in the protocol without help from the memory sub-system controller 115. In some embodiments, if the memory device 130 is busy, the push status component 150 of the memory device 130 can send an indication that it is busy and not include any other information in the transmission. Alternatively, if the memory device 130 is ready, it can include additional status information in the transmission.

Further details with regards to the operations of the memory interface component 113 and status push component 150 are described below.

Figure 1B:
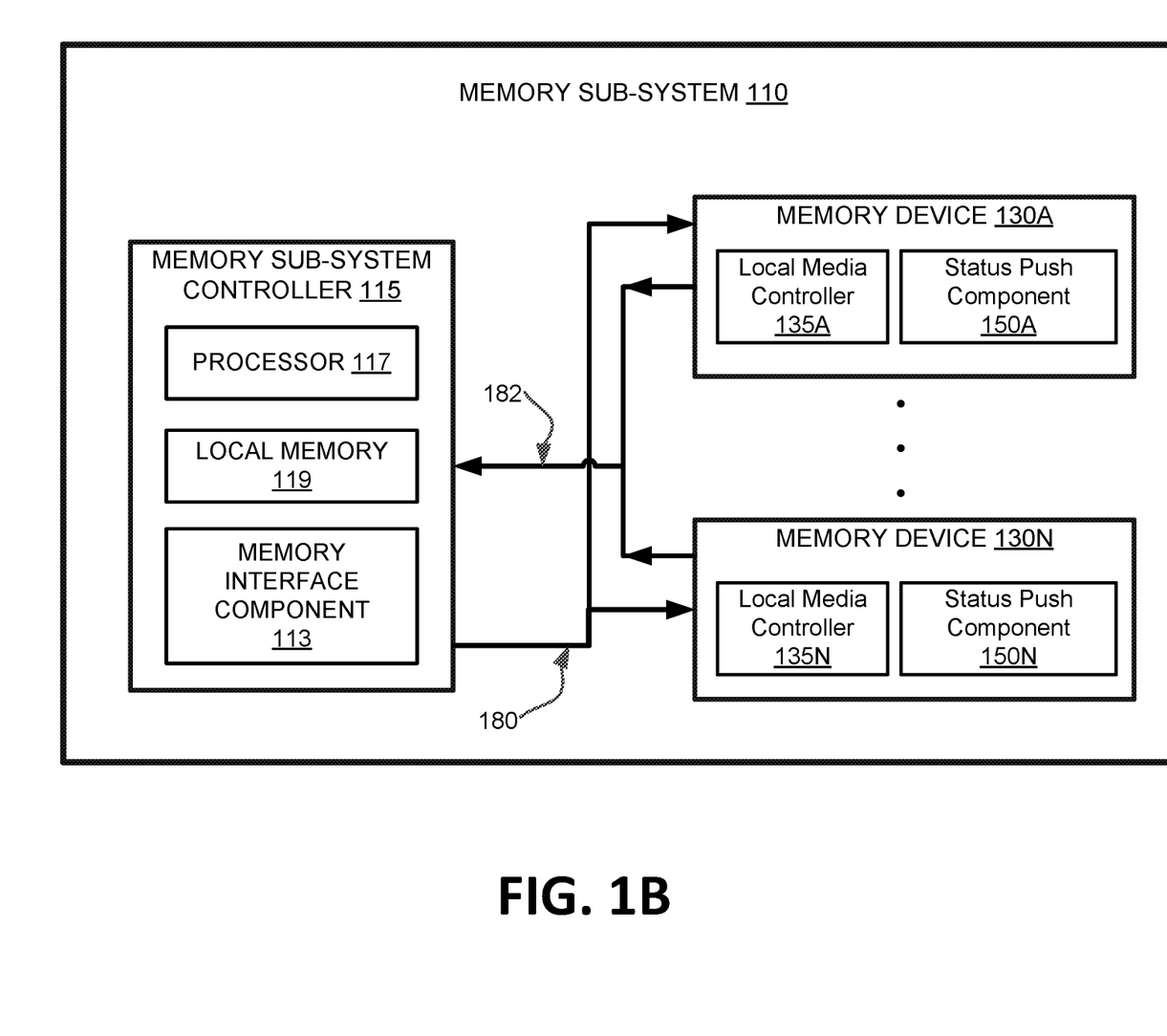
FIG. 1B illustrates an example computing system that includes the memory sub-system of FIG. 1A in additional detail, in accordance with some embodiments of the present disclosure.

FIG. 1B illustrates an example computing system that includes the memory sub-system 110 of FIG. 1A in additional detail, in accordance with some embodiments of the present disclosure. In some embodiments, memory sub-system 110 can have multiple memory devices 130A-N. In embodiments, memory devices 130A-N can share a clock signal which is received via a clock signal line bus 180. Upon a power-on event, and/or at certain time intervals (e.g., once every day, or once every hours), memory interface component 113 can transmit to memory devices 130A-N a synchronized clock signal CLK via bus 180. Status push component 150A-N of memory devices 130A-N can receive the synchronized clock signal and maintain a clock cycle count. Bus 180 can be a serial single bit bus between the memory sub-system controller 115 and memory devices 130A-N used for clock synchronization.

In some embodiments, memory devices 130A-N can be selectively enabled in response to a chip enable signal (e.g. via a control link), and can communicate over a separate single bit serial bus 182. Memory devices 130A-N can take turns as the master of bus 182, as determined by a token ring architecture bus arbitrations scheme. Memory sub-system controller 115 can be the slave of bus 182. In one embodiment, each of memory devices 130A-N includes an instance of status push component 150, which receives both the clock signal CLK and the token. In embodiments, two additional pins are installed on memory sub-system controller 115 and each memory device 130A-N to enable buses 180 and 182.

In one embodiment, a token-based ring architecture protocol is implemented, in which a token cycles through memory devices 130A-N for transmitting the status of the associated memory device 130A-N via bus 182. The period of time during which a given status push component 150A-N holds the token can be referred to as a status cycle of the associated memory device. The length of each status cycle can be variable, depending on the associated memory device's status. At the end of the status cycle, the token is passed sequentially to the next memory device. Eventually, the token is received again by the same status push component 150 which signals the beginning of a new status cycle for the associated memory device. The length of a status cycle is further described with respect to FIG. 2, and the status push protocol is further described with respect to FIG. 3.

Status push component 150A-N can keep track of the status of the associated memory device 130A-130N. In some embodiments, the status of associated memory device 130A-N can be busy or ready. In some embodiments, the status of memory device 130A-N can include additional status information, such as read calibration data, performance metrics, soft decision information, a thermal alert, and/or a memory device initiated interrupt. The local memory media controller 135A-N of each memory device 130A-N can store certain status metrics, and status push component 150A-N can determine which status metrics to include in the status information of memory device 130A-N. For example, status push component 150A can determine to include status metrics that are outside of certain threshold values, and/or to include outlier status metrics, in the transmission of status information for memory device 130A. In other embodiments, status push component 150A can include all stored status metrics. For example, status push component 150A can include all thermal alerts associated with memory device 130A, and can include only performance metrics that are outliers or above/below certain threshold values. The status push component 150A can transmit the status of the associated memory device 130A through bus 182 to memory sub-system controller 115 and to the other memory devices 130B-N.

Since information on the bus 182 is transparent for all memory devices 130A-130N, status push component 150A-150N can continuously monitor the bus 182 for token signals (which can include status updates) from the other status push components 150A-150N. Furthermore, each status push component 150A-150N can maintain a clock that is synchronized with the clocks of the other status push components 150A-150N. Using the synchronized clock and the status information, status push component 150A-150N can generate token signals for bus 182. Each status push component 150A-150N can determine when the token will be assigned to the associated memory device 130A-130N using the synchronized clock and the information from the token signals monitored from bus 182. The status cycles and token assignment process is further described with respect to FIG. 2. When status push component 150A of memory device 130A holds the token, it can transmit the status associated with memory device 130A to memory interface component 113 of memory sub-system controller 115.

Memory interface component 113 of memory sub-system controller 115 can receive the status information transmitted from status push component 150A-N and act accordingly. Hence, if status push component 150A indicates that memory device 130A is busy, memory sub-system controller 115 can refrain from sending any operations to memory device 130A. However if the status push component 150A sends a ready status to memory interface component 113, the memory sub-system controller 115 can determine to send operations (e.g., I/O operations) to memory device 130A. The memory sub-system controller 115 can send the operations through existing communication channels (not illustrated). The memory sub-system controller 115 can also receive the additional status information from status push component 150A and act accordingly. For example, if status push component 150A includes a thermal alert, memory sub-system controller 115 can perform appropriate operations in response to the thermal alert. As another example, if the status push component 150A includes read calibration data over a certain threshold, the memory sub-system controller 115 can perform certain memory management operations.

Figure 2:
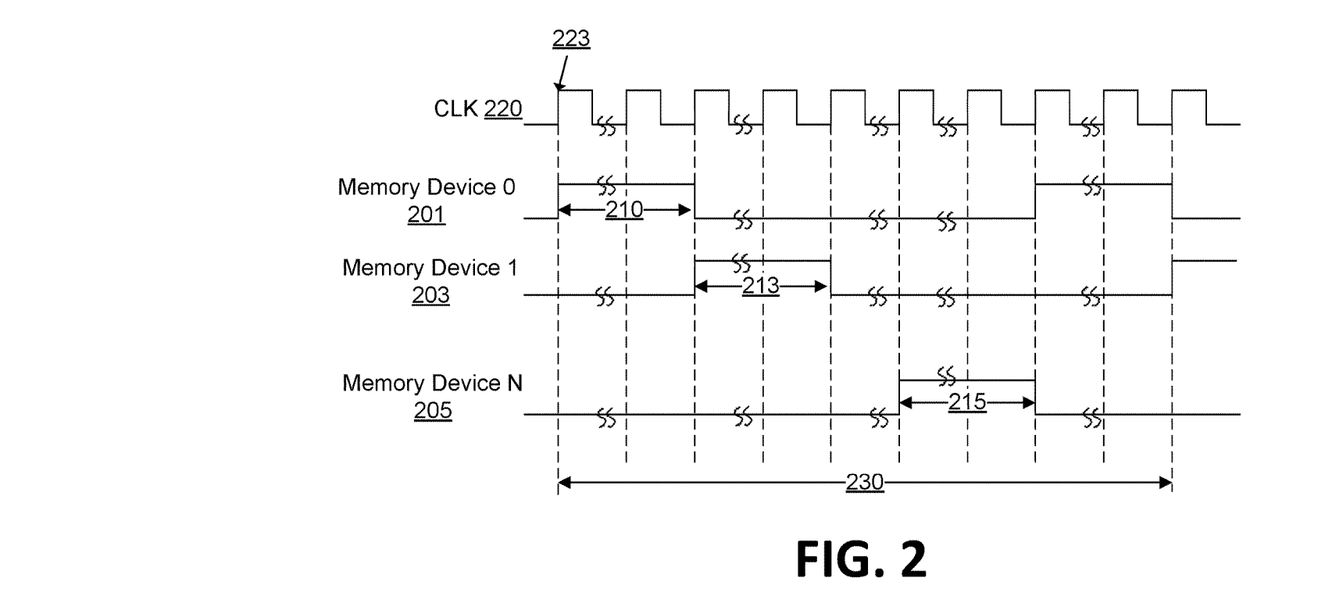
FIG. 2 illustrates an example of control timing for the token-ring round robin architecture for the bus arbitration among multiple memory devices, in accordance with some embodiments of the present disclosure.

FIG. 2 illustrates an example of control timing for the token-ring round robin architecture for the bus arbitration among multiple memory devices 201-205, in accordance with some embodiments of the present disclosure. In some embodiments, the token-ring round robin architecture can be arbitrated among multiple dies in a multi-die package.

CLK 220 illustrates the clock signal. In some embodiments, memory sub-system controller 115 of FIGS. 1A-B can continuously transmit a synchronized clock signal to each memory device 201-205, for example via bus 180 as illustrated in FIG. 1B. In some embodiments, the CLK 220 signal can be synchronized (or re-synchronized) between all memory devices 201-205 at 223, e.g., at power-on event, at a fixed interval (e.g., once a day, or once an hour), and/or at another predefined interval. A synchronization (or re-synchronization) of the CLK 220 signal between all memory devices 201-205 can be done to clear all on-going tokens. Upon synchronization (or re-synchronization) of the CLK 220 signal, the token can be initialized to memory device 0 201. The synchronization at operation 223 can occur at every power-on event. Additionally, the re-synchronization of the CLK 220 signal can occur in response to the memory sub-system controller 115 of FIGS. 1A-B detecting an error in the token ring protocol. Additionally or alternatively, the re-synchronization of the CLK 220 signal can occur periodically (e.g., at a fixed interval) to prevent potential errors in the token ring control.

Each memory device 201-205 can hold the token for a certain number of cycles of the synchronized clock. The period of time during which a memory device holds the token can be referred to a status cycle of the associated memory device. Cycle 210 illustrates the status cycle for memory device 0 201, cycle 213 illustrates the status cycle for memory device 1 203, and status cycle 215 illustrates the status cycle for memory device N 205. Cycle 230 illustrates the latency experienced by memory device 0 201, i.e., the amount of time for the token to cycle through each memory device and return back to memory device 0 201.

During status cycle 210, memory device 0 201 is master of the bus being arbitrated between memory devices 201-205 (e.g., bus 182 in FIG. 1B). During status cycle 213, associated memory device 1 203 is master of the bus. During status cycle 215, associated memory device N 205 is master of the bus. Furthermore, during status cycle 210, associated memory device 0 201 can transmit status information via the bus to the other memory devices 203-205 and to the memory subsystem controller. The memory sub-system controller is the slave of the bus. Memory devices 203-205 can receive the transmitted status information from memory device 0 201, and can determine, based on the status information, the length of status cycle 210. As described further with respect to FIG. 3, if memory device 0 201 transmits a busy status, status cycle 210 is a minimum length, during which memory device 0 201 does not transmit additional status information. In some embodiments, if the memory device 0 201 transmits a signal other than ready (e.g., busy, standby, idle, etc.), status cycle 210 is a minimum length. Thus memory device 1 203 (i.e., the next memory device in the sequential ring architecture) can determine that it will receive the token in a minimal amount of time (e.g., two clicks on the shared clock). On the other hand, if memory device 0 201 transmits a ready status (e.g., if the memory device 0 201 is transitioning from busy to ready), status cycle 210 can be longer, depending on the amount of status information pushed by memory device 0 201. Hence, each cycle 210-215 can be variable, depending on the amount of data that each memory device transmits. The length of each status cycle depends on the status information data transmitted by the memory device, and is further described with respect to FIG. 3.

Figure 3:
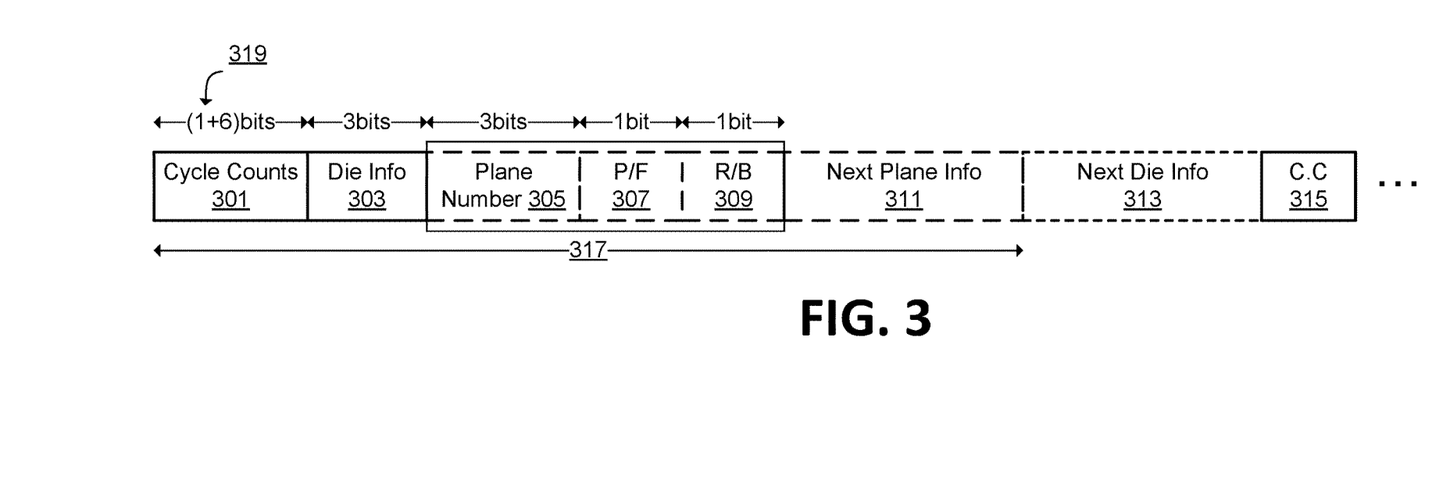
FIG. 3 illustrates an example protocol used to transmit the status of an associated memory device, in accordance with some embodiments of the present disclosure.

FIG. 3 is an example protocol used to transmit the status of the associated memory device, in accordance with some embodiments of the present disclosure. It should be noted that this is an example of the protocol that can be used to implement the token-ring architecture described herein. Other protocols not illustrated here can be used to implement the token-ring architecture described herein. In some embodiments, status push component 150 of FIGS. 1A-B use the protocol in FIG. 3 to transmit the status of the associated memory device. In some embodiments, the protocol begins with a cycle counts 301 field. The cycle counts 301 field includes a 1-bit notifier 319. In some embodiments, the notifier 319 can be set to "1" if the associated memory device is busy, in which case no other data is transmitted. When a memory device transmits that it is busy by setting the notifier 319 to "1," the status cycle of that memory device is short as it only transmits the 1-bit notifier 319. In some embodiments, a memory device sets the notifier 319 to "1" when it has a status other than ready, such as idle or standby status. If the associated die is ready, the notifier 319 can be set to "0." The following 6 bits in the cycle counts 301 field can indicate the amount of data that is to be transmitted, illustrated as 317.

The number of bits included in cycle counts 301 following the 1-bit notifier 319 can be transmitted to the other memory devices in the token-ring architecture, thus enabling a variable status cycle for each memory device. For example, a transmission of notifier 319 set to "1" by memory device 0 can indicate to the next memory device in the architecture that it will get to the token in a minimum number of clock signals (e.g., in 2 clock signals). As another example, a transmission of notifier 319 set to "0" followed by an indication of the number of data bits to be transmitted can indicate to the next memory device in the architecture that it will get the token in the number of clock signals needed to transmit the number of data bits.

In embodiments, die info 303 includes the die identification number of the associated memory device. In some embodiments, the status push component can determine the status of each plane within the die, and can transmit information about the status of each plane of the associated die. For example, the protocol can include a plane number 305 field, a pass/fail (P/F) 307 field, and/or a ready/busy (R/B) 309 field. The P/F 307 field can indicate whether an operation associated with the plane has pass or failed, for example. The R/B 309 field can indicate whether the plane is ready or busy. These data fields can be repeated for each plane in the die (e.g., in next plane info 311 field).

As the token is passed to the next memory device sequentially, the status push component of the memory device that holds the token can add its die status information to the protocol, e.g., in next die info 313.

Figure 4:
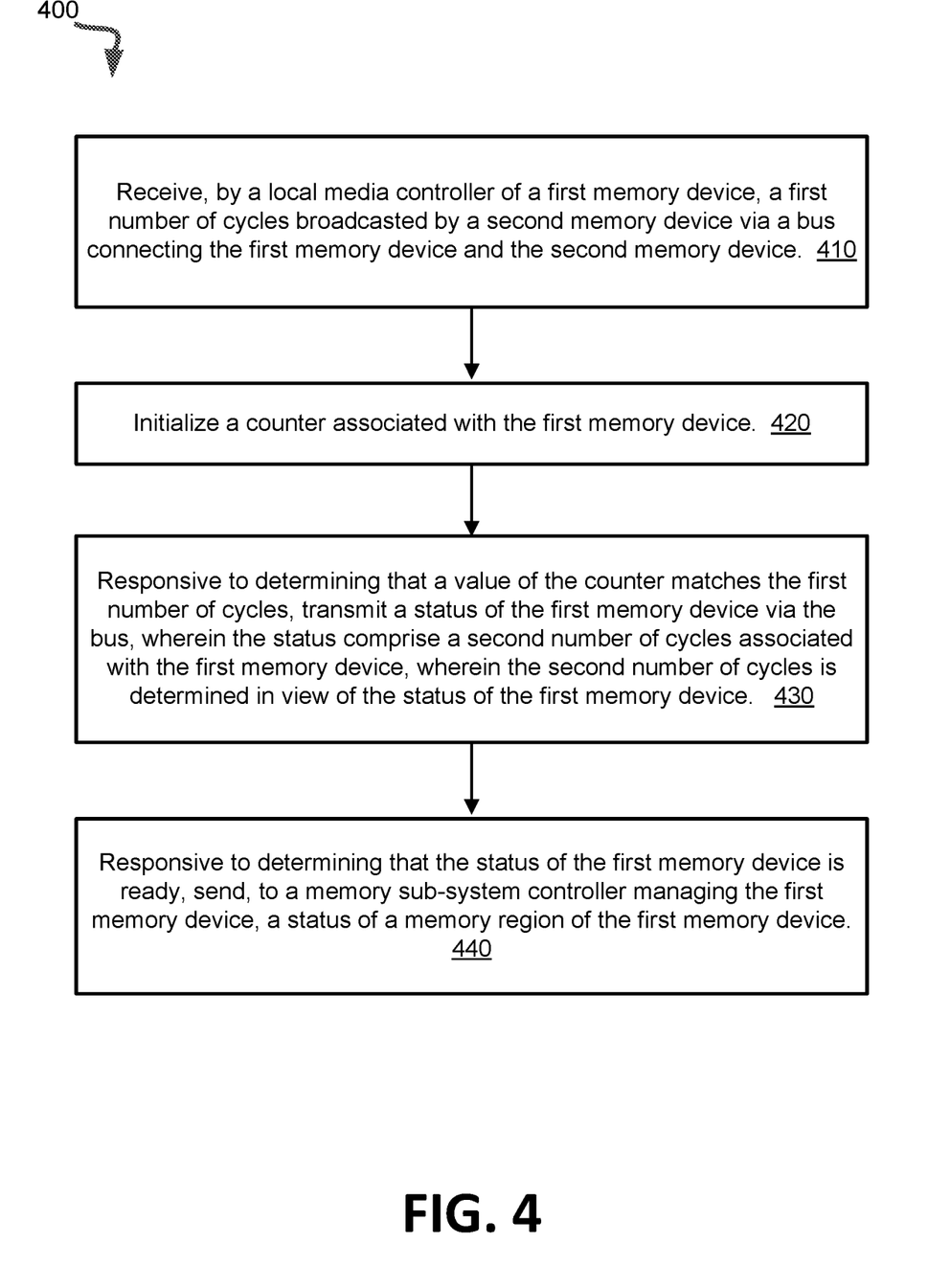
FIG. 4 is a flow diagram of an example method to implement a status push arbitration in accordance with some embodiments of the present disclosure.

FIG. 4 is a flow diagram of an example method 400 to implement a status push arbitration, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the status push component 150 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a first number of cycles (i.e., the cycle count) broadcasted by a second memory device via a bus connecting the first memory device and the second memory device. The bus can connect the memory device in a token-ring architecture that arbitrates a sideband channel used to transmit status information of the memory devices within the architecture. The second memory device can be the memory device preceding the first memory device in the ring architecture. The first number of cycles can indicate the length of time that the second memory device will hold a token. Thus, the processing logic can use the first number of cycles to determine when it will receive the token.

At operation 420, the processing logic can initialize a counter associated with the first memory device. In embodiments, the processing logic maintains a counter that is synchronized with the counters of other memory devices in the token-ring architecture (e.g., with a second counter associated with the second memory device). Initializing a counter can include marking the time on the counter from which to start counting the number of cycles, in order to identify when it will receive the token.

In some embodiments, the processing logic can receive a synchronized clock command during a powering on event via a single-bit serial bus. Additionally or alternatively, the processing logic can receive a synchronized clock command at a fixed interval, and/or in response to determining an error within the token-ring architecture. In embodiments, in response to receiving a synchronized clock command, the processing logic can determine that the token is assigned to the first memory device. That is, the number of cycles (i.e., the cycle count) associated with the preceding memory device (i.e., the second memory device) in the token-ring architecture have elapsed, and the first memory device now holds the token. When the processing logic holds the token, it is the master of the bus being arbitrated between multiple memory devices, and hence the processing logic can transmit its status information.

At operation 430, responsive to determining that a value of the counter matches the first number of cycles, the processing logic transmits a status of the first memory device via the bus. In some embodiments, the first memory device maintains its status, and at operation 430, the processing logic identifies the status of the first memory device. The status of the first memory device can include whether the memory device is busy or ready. In some embodiments, the status of the first memory device can further include a ready/busy status for memory regions within the first memory device (e.g., the ready/busy status of a plane within a memory die), and/or the pass/fail status of memory regions within the first memory device (e.g., the pass/fail status of a plane within a memory die). In some embodiments, the status information of the first memory device can also include a performance metric, a thermal alert, an interrupt, read calibration data, soft decision (SD) information, or any other data that the memory device can determine about itself.

As mentioned above, at operation 430, the processing logic transmits a status of the first memory device via the bus. The status of the first memory device can include a second number of cycles associated with the first memory device. In some embodiments, responsive to determining that the status of the first memory device is busy, the processing logic can determine that the second number of cycles is a minimal number of cycles. For example, the minimal number of cycles may be 2, in which case, if the first memory device is busy, the processing logic can update the token to include 2 cycles associated with the first memory device. This will indicate to the other memory devices in the token-ring architecture that the first memory device will hold the token for 2 cycles of the shared synchronized clock. When a memory device is transitioning from busy to ready, the number of cycles can exceed the minimal number of cycles; otherwise, the number of cycles is the minimal number of cycles.

If the status of the first memory device is ready, the processing logic can further determine the status (ready/busy, and/or pass/fail) of memory regions within the memory device. The second number of cycles can be determined in view of this additional status information. That is, the processing logic can determine the number of bits required to send the ready/busy status and/or pass/fail status of the memory regions. The second number of cycles can represent the number of cycles required to send the additional data. For example, it may take one cycle to send 8 bits of data, in which case sending status information that include 24 bits of data (where the status information indicates the ready/busy status and pass/fail status of memory planes within the first memory device, for example), would require 3 cycles. In some embodiments, the processing logic can further include additional information in the status of the first memory device (e.g., an outlier for a performance metric, soft decision information, a thermal alert, an interrupt, or read calibration data), and the second number of cycles is determined based on the additional information included in the status information of the first memory device.

In some embodiments, the status of the first memory device is sent to the memory sub-system controller via a sideband channel. In some embodiments, additional pins are added to the memory sub-system controller and the first and second memory devices to enable the sideband channel, and to enable the single-bit serial bus used to send the synchronized clock command.

In embodiments, responsive to sending a ready status to the memory sub-system controller, the processing logic receives, from the memory sub-system controller, an input/output (I/O) operation via an input/output channel.

At operation 440, responsive to determining that the status of the first memory device is ready, the processing logic sends, to a memory sub-system controller managing the first memory device, the status of a memory region within the first memory device. The status can include at least one of: a ready/busy status of a memory region within the first memory device, or a pass/fail status of a memory region within the first memory device. In some embodiments, the processing logic can further send at least one of: an outlier for a performance metric, soft decision information, a thermal alert, an interrupt, or read calibration data, and wherein the second number of cycles is determined in view of the outlier for the performance metric, the soft decision information, the thermal alert, the interrupt, or the read calibration data.

Figure 5:
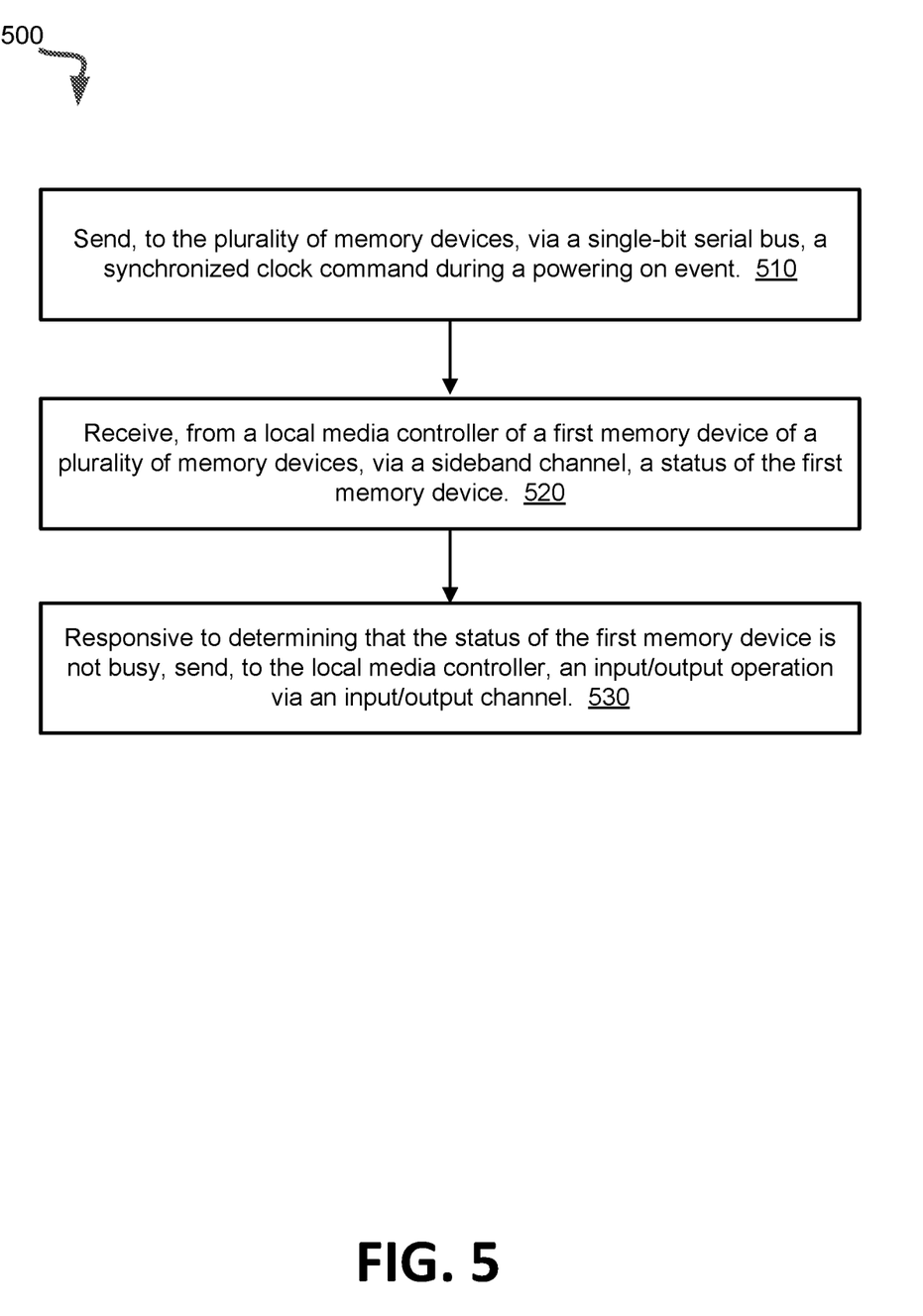
FIG. 5 is a flow diagram of an example method to receive status information via a sideband channel, in accordance with some embodiments of the present disclosure.

FIG. 5 is a flow diagram of an example method 500 to receive status information from a sideband channel, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory interface component 113 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic sends, to the plurality of memory devices via a single-bit serial bus, a synchronized clock command during a powering on event. In embodiments, the processing logic can send the synchronized clock command at a predefined interval (e.g., once a day, once an hour, or at another time interval), and/or in response to receiving an indication of an error from one of the plurality of memory devices. That is, if one of the memory detects an error within the token-ring architecture, the memory device can transmit the error to the processing logic. The processing logic can then reset the clocks of the plurality of memory devices by sending a synchronized clock command.

At operation 520, the processing logic receives, from a local media controller of a first memory device of a plurality of memory devices, via a sideband channel, a status of the first memory device. The status of the first memory device can be ready or busy. In some embodiments, the processing logic receives status information of the first memory device, such as a ready/busy status of a memory region within the first memory device (e.g., of a plane within a die of the first memory device), a pass/fail status of the region within the first memory device. In some embodiments, the processing logic receives an interrupt, a thermal alert, read calibration data, soft decision information, and/or a performance outlier data from the first memory device. The processing logic can process the received information and react accordingly.

At operation 530, responsive to determining that the status of the first memory device is ready, the processing logic sends, to the local media controller, an input/output operation via an input/output channel. By waiting for a ready status from a memory device, which is sent via the sideband channel, the processing logic uses the I/O channel for I/O operations, and no longer needs to use the I/O channel for status polling commands.

In some embodiments, the local media controller of the first memory device is the master of the sideband channel, and the memory sub-system controller is the master of the input/output channel. In some embodiments, additional pins are added to the memory sub-system controller and the first and second memory devices to enable the sideband channel, and to enable the single-bit serial bus used to send the synchronized clock command.

Figure 6:
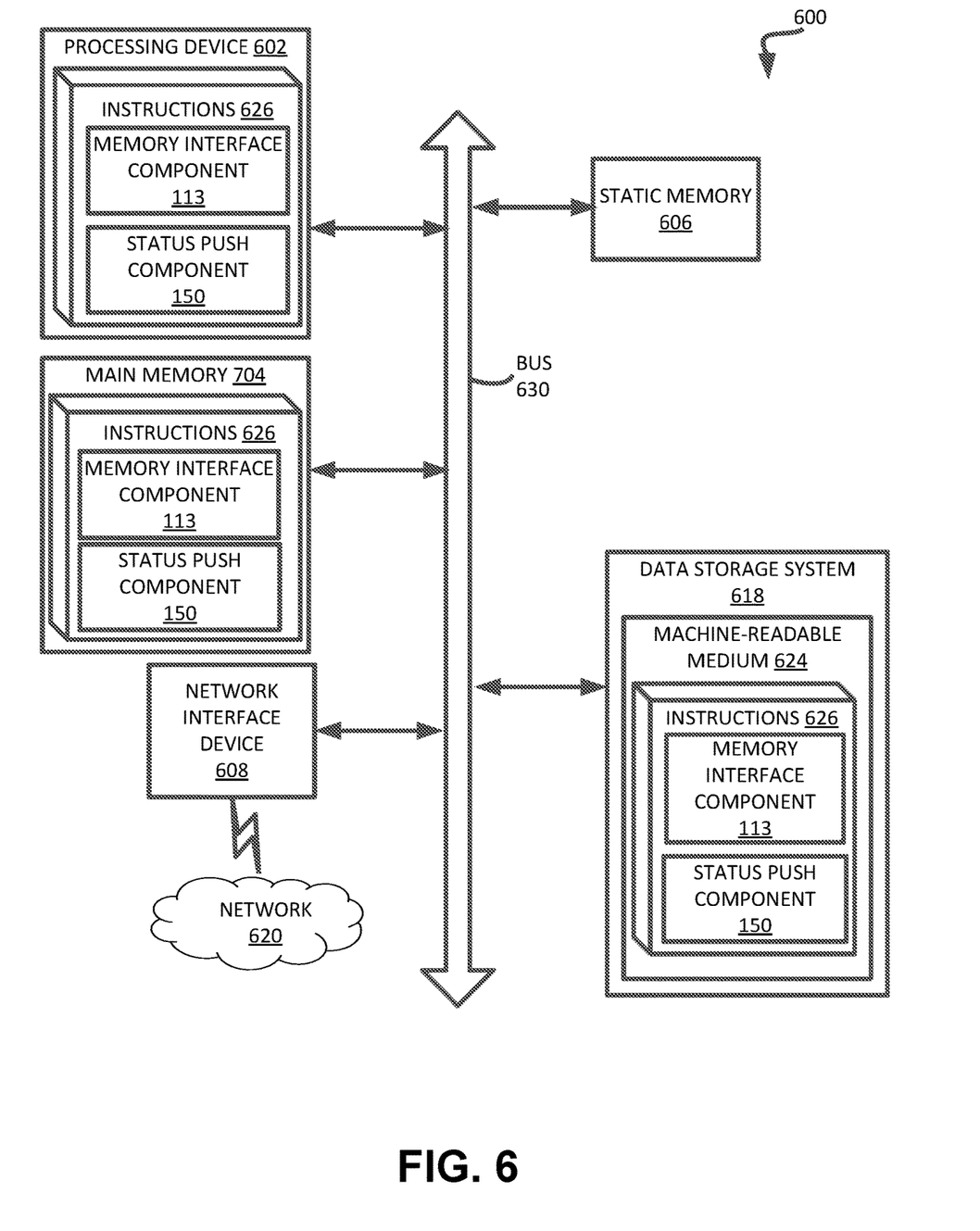
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the memory interface component 113 and/or status push component 150 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to a memory interface component and/or status push component (e.g., the memory interface component 113 and/or status push component 150 of FIG. 1A). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a local media controller of a first memory device, a first number of cycles broadcasted by a second memory device via a bus connecting the first memory device and the second memory device;
   initializing a counter associated with the first memory device;

responsive to determining that a value of the counter matches the first number of cycles, transmitting a status of the first memory device via the bus, wherein the status comprises a second number of cycles associated with the first memory device, wherein the second number of cycles is determined in view of the status of the first memory device; and responsive to determining that the status of the first memory device is ready, sending, to a memory sub-system controller managing the first memory device, a status of a memory region of the first memory device.

2. The method of claim 1, further comprising:
responsive to determining that the status of the first memory device is busy, determining that the second number of cycles is a minimal number of cycles.

3. The method of claim 1, wherein the local media controller of the first memory device maintains the counter that is synchronized with a second counter associated with the second memory device.

4. The method of claim 1, wherein the status of the memory region within the first memory device comprises at least one of: ready/busy status of the memory region, or pass/fail status of the memory region, and wherein the second number of cycles is further determined in view of the ready/busy status of the memory region, or the pass/fail status of the memory region.

5. The method of claim 1, wherein responsive to determining that the status of the first memory device is ready, the local media controller of the first memory device is further to send, to the memory sub-system controller managing the first memory device, at least one of: an outlier for a performance metric, soft decision information, a thermal alert, an interrupt, or read calibration data, and wherein the second number of cycles is determined in view of the outlier for the performance metric, the soft decision information, the thermal alert, the interrupt, or the read calibration data.

6. The method of claim 1, further comprising:
receiving, via a single-bit serial bus, a synchronized clock command during at least one of: a powering on event, a predefined time interval, or responsive to detecting an error on the first memory device.

7. The method of claim 1, wherein the status of the memory region within the first memory device is sent to the memory sub-system controller via a sideband channel.

8. The method of claim 1, further comprising:
receiving, from the memory sub-system controller, an input/output (I/O) operation via an input/output channel in response to sending the status of the memory region within the first memory device.

9. A non-transitory computer-readable storage medium comprising instructions that, when executed by a processing device, cause the processing device to perform operations comprising:
receiving, by a local media controller of a first memory device, a first number of cycles broadcasted by a second memory device via a bus connecting the first memory device and the second memory device;
initializing a counter associated with the first memory device;
responsive to determining that a value of the counter matches the first number of cycles, transmitting a status of the first memory device via the bus, wherein the status comprises a second number of cycles associated with the first memory device, wherein the second number of cycles is determined in view of the status of the first memory device; and
responsive to determining that the status of the first memory device is ready, sending, to a memory sub-system controller managing the first memory device, a status of a memory region of the first memory device.

10. The non-transitory computer-readable storage medium of claim 9, further comprising:
responsive to determining that the status of the first memory device busy, determining that the second number of cycles is a minimal number of cycles.

11. The non-transitory computer-readable storage medium of claim 9, wherein the local media controller of the first memory device maintains the counter that is synchronized with a second counter associated with the second memory device.

12. The non-transitory computer-readable storage medium of claim 11, wherein the status of the memory region within the first memory device comprises at least one of: ready/busy status of the memory region, or pass/fail status of the memory region, and wherein the second number of cycles is further determined in view of the ready/busy status of the memory region, or the pass/fail status of the memory region.

13. The non-transitory computer-readable storage medium of claim 9, wherein responsive to determining that the status of the first memory device is ready, the local media controller of the first memory device is further to send, to the memory sub-system controller managing the first memory device, at least one of: an outlier for a performance metric, soft decision information, a thermal alert, an interrupt, or read calibration data, and wherein the second number of cycles is determined in view of the outlier for the performance metric, the soft decision information, the thermal alert, the interrupt, or the read calibration data.

14. The non-transitory computer-readable storage medium of claim 9, further comprising:
receiving, via a single-bit serial bus, a synchronized clock command during at least one of: a powering on event, a predefined time interval, or responsive to detecting an error on the first memory device.

15. The non-transitory computer-readable storage medium of claim 9, wherein the status of the memory region within the first memory device is sent to the memory sub-system controller via a sideband channel.

16. A system comprising:
a plurality of memory devices; and
a processing device, operatively coupled to the plurality of memory devices, to perform operations comprising:
receiving, by a local media controller of a first memory device of the plurality of memory devices, a first number of cycles broadcasted by a second memory device of the plurality of memory devices via a bus connecting the first memory device and the second memory device;
initializing a counter associated with the first memory device;
responsive to determining that a value of the counter matches the first number of cycles, transmitting a status of the first memory device via the bus, wherein the status comprises a second number of cycles associated with the first memory device, wherein the second number of cycles is determined in view of the status of the first memory device; and
responsive to determining that the status of the first memory device is ready, sending, to a memory sub-system controller managing the first memory device, a status of a memory region of the first memory device.

17. The system of claim 16, wherein the operations further comprise:

responsive to determining that the status of the first memory device is busy, determining that the second number of cycles is a minimal number of cycles.

18. The system of claim 16, wherein the local media controller of the first memory device maintains the counter that is synchronized with a second counter associated with the second memory device.

19. The system of claim 16, wherein the status of the memory region within the first memory device comprises at least one of: ready/busy status of the memory region, or pass/fail status of the memory region, and wherein the second number of cycles is further determined in view of the ready/busy status of the memory region, or the pass/fail status of the memory region.

20. The system of claim 16, wherein responsive to determining that the status of the first memory device is ready, the local media controller of the first memory device is further to send, to the memory sub-system controller managing the first memory device, at least one of: an outlier for a performance metric, soft decision information, a thermal alert, an interrupt, or read calibration data, and wherein the second number of cycles is determined in view of the outlier for the performance metric, the soft decision information, the thermal alert, the interrupt, or the read calibration data.

* * * * *